United States Patent
Lawlor et al.

(10) Patent No.: US 12,008,786 B2
(45) Date of Patent: Jun. 11, 2024

(54) METHOD, APPARATUS, AND COMPUTER PROGRAM PRODUCT FOR POINT-TO-POINT TRANSLATION BETWEEN IMAGES

(71) Applicant: HERE GLOBAL B.V., Eindhoven (NL)

(72) Inventors: David Lawlor, Evanston, IL (US); Niranjan Kotha, Berkeley, CA (US); Zhanwei Chen, Lasalle (CA)

(73) Assignee: HERE GLOBAL B.V., Eindhoven (NL)

( * ) Notice: Subject to any disclaimer, the term of this patent is extended or adjusted under 35 U.S.C. 154(b) by 683 days.

(21) Appl. No.: 17/132,790

(22) Filed: Dec. 23, 2020

(65) Prior Publication Data

US 2022/0198700 A1 Jun. 23, 2022

(51) Int. Cl.
  *G06K 9/00* (2022.01)
  *G01C 21/00* (2006.01)
  (Continued)

(52) U.S. Cl.
  CPC ............ *G06T 7/74* (2017.01); *G01C 21/3848* (2020.08); *G06F 16/2379* (2019.01);
  (Continued)

(58) Field of Classification Search
  CPC ... G06T 7/74; G06T 3/20; G06T 2207/30244; G06F 16/2379; G06F 16/29; G01C 21/3848
  See application file for complete search history.

(56) References Cited

U.S. PATENT DOCUMENTS

| | | | | |
|---|---|---|---|---|
| 6,816,629 | B2 * | 11/2004 | Redlich | G06T 17/10 |
| | | | | 382/285 |
| 2012/0050489 | A1 * | 3/2012 | Gupta | G06V 20/588 |
| | | | | 348/148 |
| 2020/0005536 | A1 * | 1/2020 | Esteban | G06T 7/55 |

FOREIGN PATENT DOCUMENTS

CN 109859314 A 6/2019

OTHER PUBLICATIONS

Schinstock, Dale E., Chris Lewis, and Craig Buckley. "An alternative cost function to bundle adjustment used for aerial photography from UAVs." ASPRS Annual Conference. 2009. (Year: 2009).*

(Continued)

*Primary Examiner* — Avinash Yentrapati

(57) ABSTRACT

A method, apparatus and computer program product are provided for establishing correspondences between images using through generation of a translation between the different perspectives. Methods may include: receiving first sensor data from a first image sensor, where the first sensor data includes a first image of an environment captured from a first perspective; receiving second sensor data from a second image sensor of a second image of the environment captured from a second perspective; identifying image correspondence points between the first sensor data and the second sensor data; computing pairwise vectors between corresponding pairs of first projected points of the first sensor data and second projected points of the second sensor data; clustering the pairwise vectors according to magnitude and orientation; and generating a translation vector from clusters of pairwise vectors, where the translation vector represents a shift of the second image sensor data to correspond to ground truth data.

20 Claims, 7 Drawing Sheets

(51) Int. Cl.
    *G06F 16/23*    (2019.01)
    *G06F 16/29*    (2019.01)
    *G06T 3/20*     (2006.01)
    *G06T 7/73*     (2017.01)
(52) U.S. Cl.
    CPC .............. *G06F 16/29* (2019.01); *G06T 3/20* (2013.01); *G06T 2207/30244* (2013.01)

(56) References Cited

OTHER PUBLICATIONS

Shi et al., *Spatial-Aware Feature Aggregation for Cross-View Image Based Geo-Localization*, Australian National University.

Zhang et al., *Multiview Supervision by Registration*, University of Pennsylvania, University of Minnesota, (9 pages).

Shi et al., *Optimal Feature Transport for Cross-View Image Geo-Localization*, Australian National University, arXiv:1907.05021v3 [cs.CV] Nov. 27, 2019.

Schinstock et al., *An Alternative Cost Function to Bundle Adjustment Used for Aerial Photography From UAVS*, ResearchGate, ASPRS 2009 Annual conference, Baltimore, MD, Mar. 9-13, 2009 (9 pages).

\* cited by examiner

METHOD, APPARATUS, AND COMPUTER PROGRAM PRODUCT FOR POINT-TO-POINT TRANSLATION BETWEEN IMAGES

TECHNOLOGICAL FIELD

Example embodiments of the present disclosure relate generally to establishing correspondences between images taken from substantially different perspectives, and more particularly, for establishing correspondences between images using through generation of a translation between the different perspectives.

BACKGROUND

Map generation for two-dimensional and three-dimensional maps is a time consuming and data-intensive process, particularly when generating three-dimensional maps that are highly accurate. Identifying accurate locations within three-dimensional maps can be of critical importance when those maps are employed for route guidance and to facilitate autonomous and semi-autonomous vehicle control. For a three-dimensional map to be of a quality sufficient to facilitate autonomous and semi-autonomous vehicle control, the maps must include substantial detail and accurate location of boundaries and objects within the mapped region and for the road geometry.

Road geometry modelling is very useful for three-dimensional map creation and 3D terrain identification along with feature and obstacle detection in environments, each of which may facilitate autonomous vehicle navigation along a prescribed path. Traditional methods for 3D modelling of road geometry and object or feature detection and correlation of features between images from different perspectives are resource intensive, often requiring significant amounts of human measurement and calculation. Such methods are thus time consuming and costly. Exacerbating this issue is the fact that many modern-day applications (e.g., 3D mapping, terrain identification, or the like) require manual or semi-automated analysis and labelling of large amounts of data, and therefore are not practical without quicker or less costly techniques.

Some current methods rely upon feature detection from image data to perform road terrain detection or environment feature detection, but these methods have deficiencies. For instance, some systems designed for terrain and feature detection around a vehicle exist but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in three-dimensional space due to inaccuracy during the detection stage. Locating of objects in three-dimensional space from two dimensional images is challenging and is generally resource intensive.

BRIEF SUMMARY

Accordingly, a method, apparatus, and computer program product are provided for establishing correspondences between images taken from substantially different perspectives, and more particularly, for establishing correspondences between images using through generation of a translation between the different perspectives. In a first example embodiment, an apparatus is provided including at least one processor and at least one memory including computer program code, the at least one memory and the computer program code may be configured to, with the at least one processor, cause the apparatus to: receive three-dimensional coordinates of points in a first image of an environment captured in first sensor data by a first image sensor from a first perspective; project the three-dimensional coordinates of points in the first image of the environment onto an approximate ground plane to form first projected points; receive second sensor data from a second image sensor, where the second sensor data includes a second image of the environment captured from a second perspective; project rays from the second sensor data into the approximate ground plane to generate second projected points, where the rays include lines that extend from a position of the second sensor through image correspondence points of the second sensor data; compute pairwise vectors between corresponding pairs of the first projected points of the first sensor data and the second projected points of the second sensor data; and generate a translation vector from the pairwise vectors, where the translation vector represents a shift of the second image sensor data to correspond to ground truth data.

According to an example embodiment, the first image of the environment captured from the first perspective is captured along a first axis, where the second image of the environment captured from the second perspective is captured along a second axis, where the first axis and the second axis are separated by at least forty-five degrees. Causing the apparatus of some embodiments to generate a translation vector from the pairwise vectors may include causing the apparatus to cluster the pairwise vectors according to magnitude and orientation, and generate a translation vector from clusters of the pairwise vectors. The apparatus may be caused to translate the second projected points using the translation vector to obtain correspondences between the second projected points and the first projected points.

The apparatus of some embodiments is caused to establish an orientation of the second image sensor based, at least in part, on the correspondences between the second projected points and the first projected points. The apparatus may be caused to identify a precise location of the second image based, at least in part, on the correspondences between the second projected points and the first projected points. The apparatus may optionally be caused to provide for building or updating a map in a map database based on the precise location of the second image. According to some embodiments, the apparatus may be caused to assign correspondences between the first projected points and the second projected points using the translation vector. Causing the apparatus to assign correspondences between the first projected points and the second projected points using the translation vector may include causing the apparatus to assign correspondences between a respective second projected point with a distance to a respective closest one of the first projected points and excluding second projected points with a distance to a respective closest one of the first projected points above a predefined threshold distance.

Embodiments provided herein may include a computer program product including at least one non-transitory computer-readable storage medium having computer-executable program code instructions, the computer-executable program code instructions including program code instructions that, when executed, cause an apparatus to: receive three-dimensional coordinates of points in a first image of an environment captured in first sensor data by a first image sensor from a first perspective; project the three-dimensional coordinates of points in the first image of the environment onto an approximate ground plane to form first projected points; receive second sensor data from a second image sensor, where the second sensor data includes a second image of the environment captured from a second perspective; project rays from the second sensor data into the approximate ground plane to generate second projected points, where the rays include lines that extend from a position of the second sensor through image correspondence points of the second sensor data; compute pairwise vectors between corresponding pairs of the first projected points of the first sensor data and the second projected points of the second sensor data; and generate a translation vector from the pairwise vectors where the translation vector represents a shift of the second image sensor data to correspond to ground truth data.

The first image of the environment captured from the first perspective may be captured along a first axis, where the second image of the environment captured from the second perspective is captured along a second axis, where the first axis and the second axis are separated by at least forty-five degrees. The program code instructions to generate a translation vector from the pairwise vectors include program code instructions to: cluster the pairwise vectors according to magnitude and orientation; and generate a translation vector from clusters of the pairwise vectors. Embodiments may include program code instructions to translate the second projected points using the translation vector to obtain correspondences between the second projected points and the first projected points. Embodiments may include program code instructions to establish an orientation of the second image sensor based, at least in part, on correspondences between the second projected points and the first projected points. Embodiments may include program code instructions to identify a precise location of the second image based, at least in part, on the correspondences between the second projected points and the first projected points.

Embodiments may include program code instructions to provide for building or updating a map in a map database based on the precise location of the second image. According to an example embodiment, the computer program product may include program code instructions to assign correspondences between the first projected points and the second projected points using the translation vector. The program code instructions to assign correspondences between the first projected points and the second projected points using the translation vector may include program code instructions to assign correspondences between the second projected points with a respective closest one of the first projected points and excluding second projected points with a distance to a respective closest one of the first projected points being above a predefined threshold distance.

Embodiments provided herein may include a method including: receiving first sensor data from a first image sensor, where the first sensor data includes a first image of an environment captured from a first perspective; receiving second sensor data from a second image sensor, where the second sensor data includes a second image of the environment captured from a second perspective; identifying image correspondence points between the first sensor data and the second sensor data; computing pairwise vectors between corresponding pairs of first projected points of the first sensor data and second projected points of the second sensor data; clustering the pairwise vectors according to magnitude and orientation; and generating a translation vector from clusters of pairwise vectors, where the translation vector represents a shift of the second image sensor data to correspond to ground truth data.

According to an example embodiment, computing pairwise vectors between corresponding pairs of first projected points of the first sensor data and second projected points of the second sensor data includes: projecting the three-dimensional coordinates of points in the first image of the environment onto an approximate ground plane to form the first projected points; projecting rays from the second sensor data into the approximate ground plane to generate the second projected points, where the rays include lines that extend from a position of the second sensor through image correspondence points of the second sensor data; and computing pairwise vectors between corresponding pairs of the first projected points of the first sensor data and the second projected points of the second sensor data.

Embodiments provided herein may include an apparatus including: means for receiving first sensor data from a first image sensor, where the first sensor data includes a first image of an environment captured from a first perspective; means for receiving second sensor data from a second image sensor, where the second sensor data includes a second image of the environment captured from a second perspective; means for identifying image correspondence points between the first sensor data and the second sensor data; means for computing pairwise vectors between corresponding pairs of first projected points of the first sensor data and second projected points of the second sensor data; means for clustering the pairwise vectors according to magnitude and orientation; and means for generating a translation vector from clusters of pairwise vectors, where the translation vector represents a shift of the second image sensor data to correspond to ground truth data.

According to an example embodiment, the means for computing pairwise vectors between corresponding pairs of first projected points of the first sensor data and second projected points of the second sensor data includes: means for projecting the three-dimensional coordinates of points in the first image of the environment onto an approximate ground plane to form the first projected points; means for projecting rays from the second sensor data into the approximate ground plane to generate the second projected points, where the rays include lines that extend from a position of the second sensor through image correspondence points of the second sensor data; and means for computing pairwise vectors between corresponding pairs of the first projected points of the first sensor data and the second projected points of the second sensor data.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
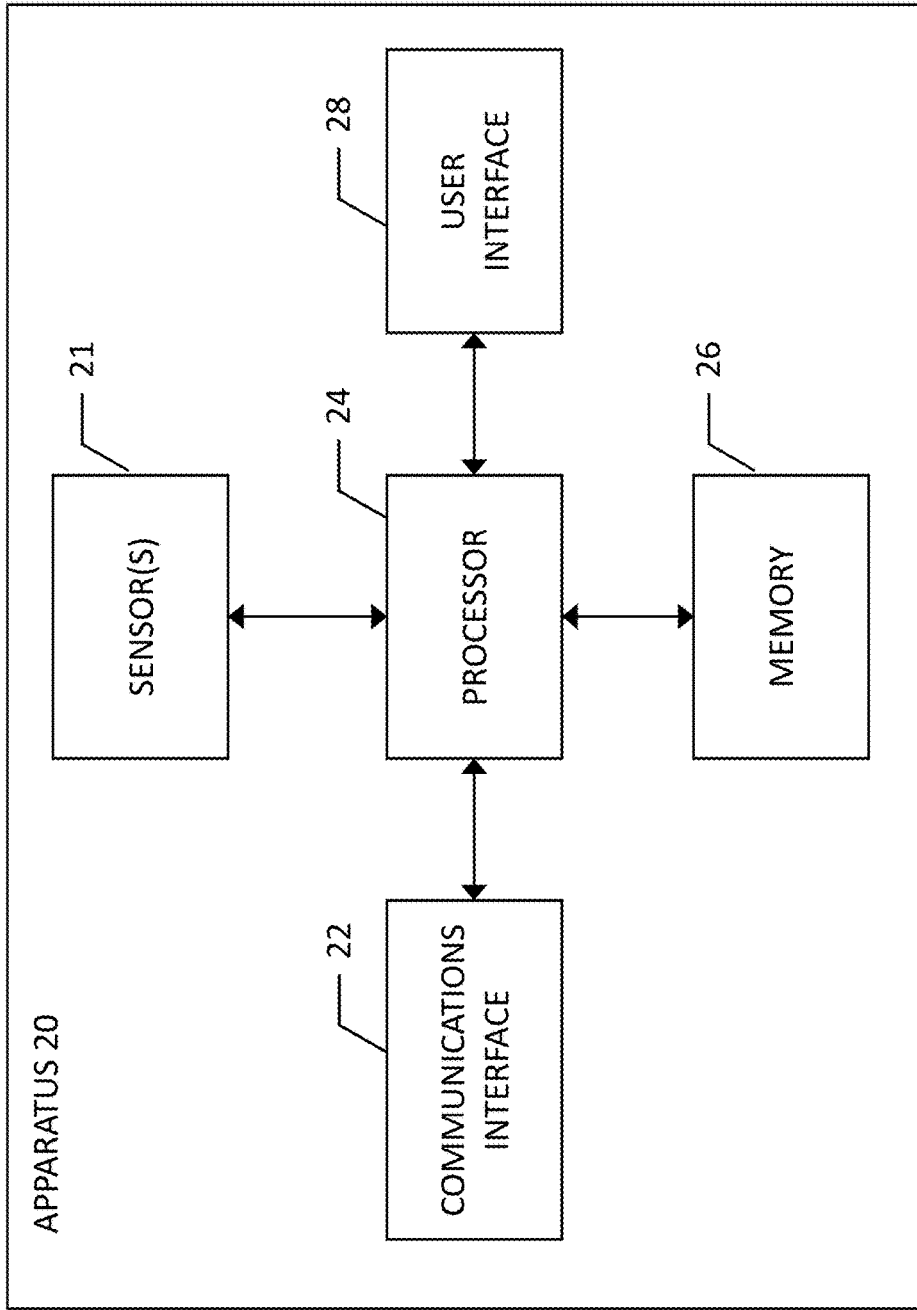
Figure 2:
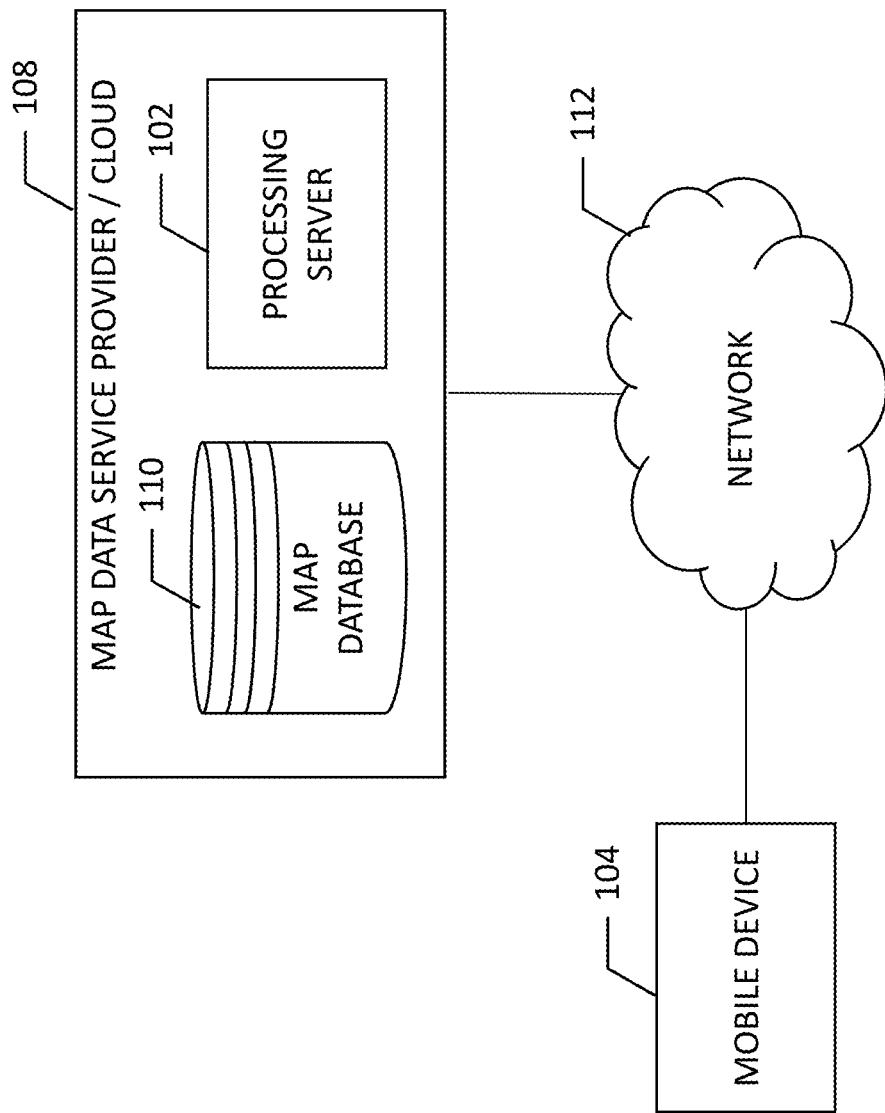
Figure 3:
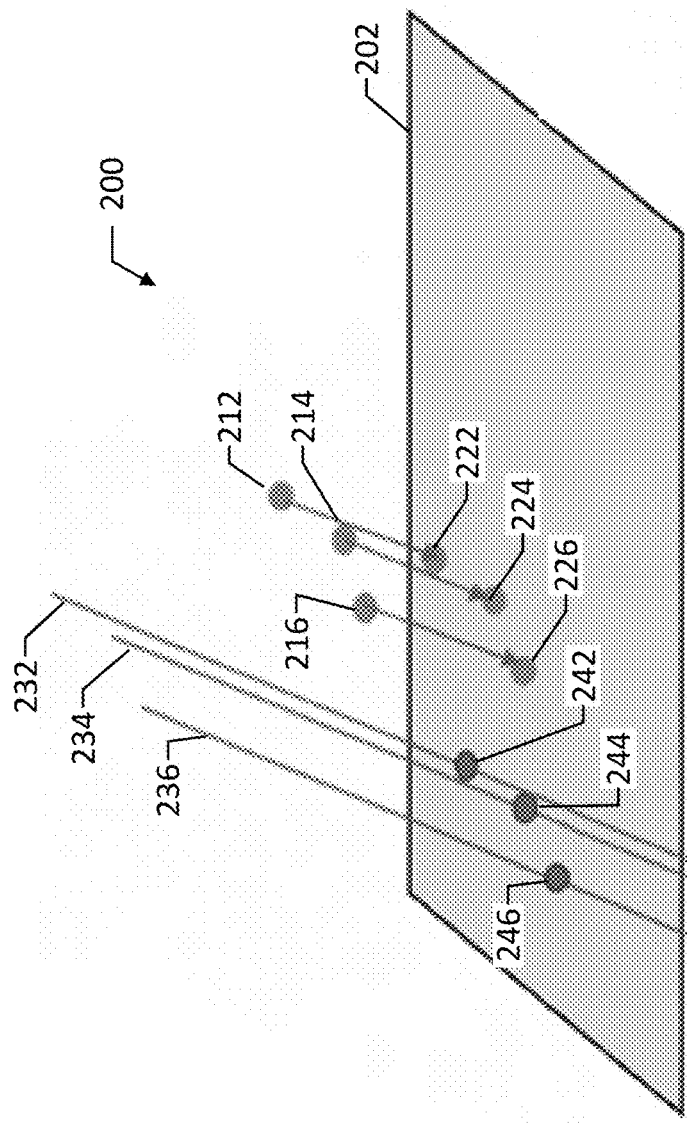
Figure 4:
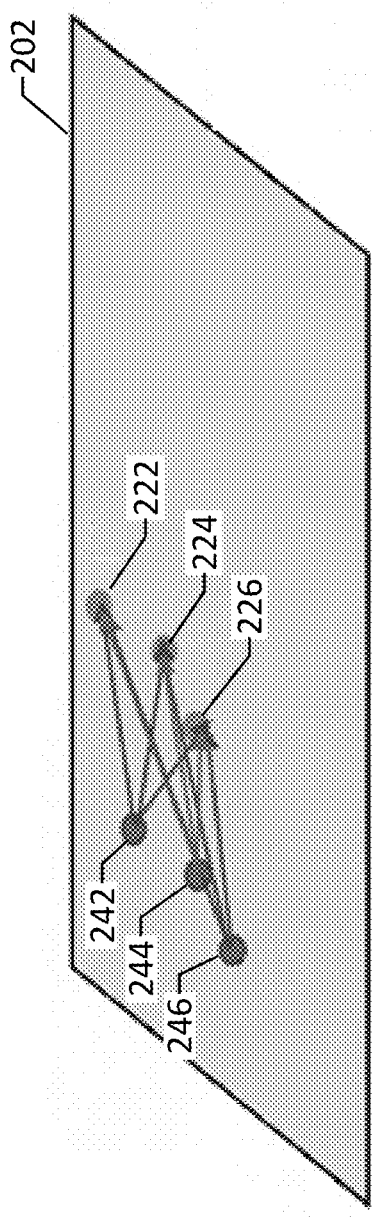
Figure 5:
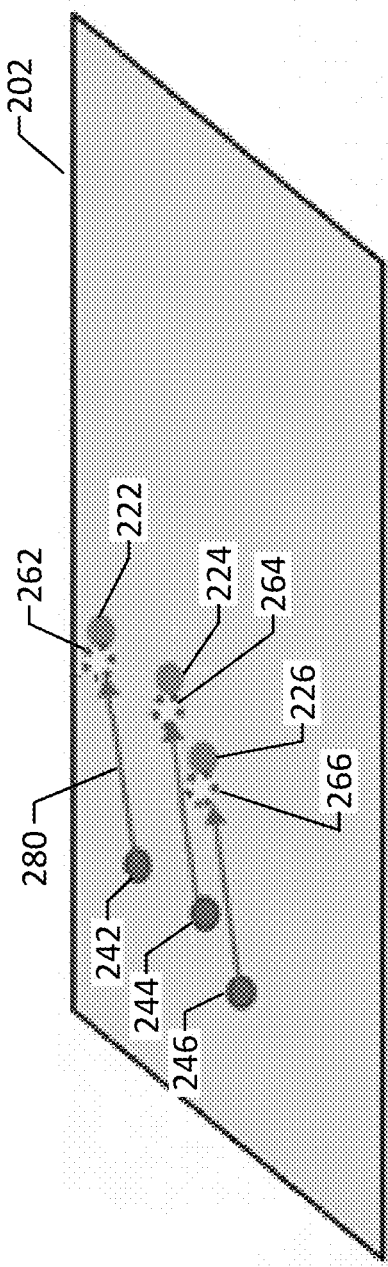
Figure 6:
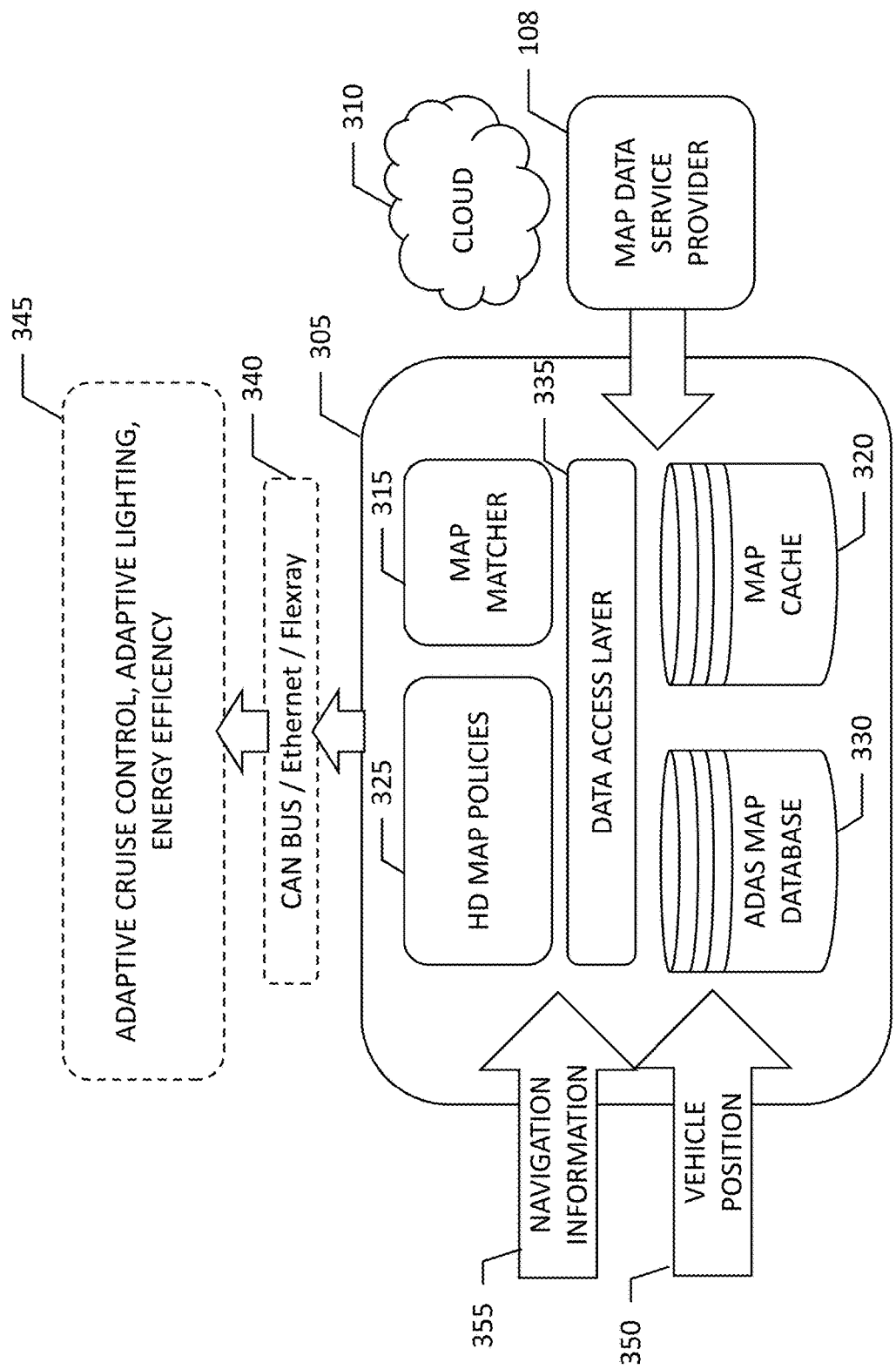
Figure 7:
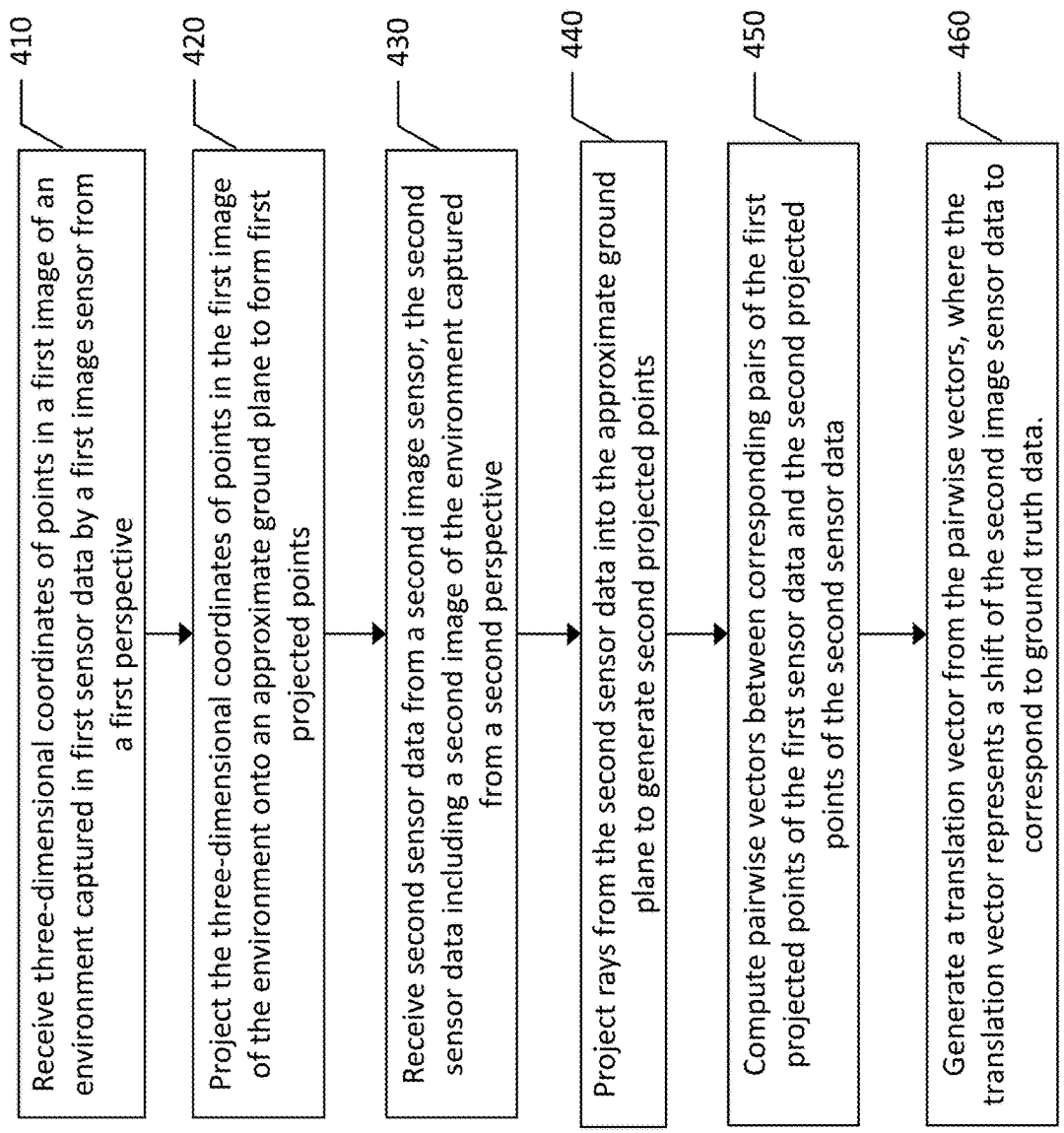

Having thus described certain example embodiments of the present disclosure in general terms, reference will here- inafter be made to the accompanying drawings which are not necessarily drawn to scale, and wherein:

FIG. 1 is a block diagram of an apparatus according to an example embodiment of the present disclosure;

FIG. 2 is a block diagram of a system for iteratively establishing the position of a detected object according to an example embodiment of the present disclosure;

FIG. 3 illustrates an example approximate ground plane with first and second projected points according to an example embodiment of the present disclosure;

FIG. 4 illustrates pairwise vectors between the second projected points and the first projected points in the approximate ground plane according to an example embodiment of the present disclosure;

FIG. 5 illustrates translation vectors between the second projected points and the first projected points in the approximate ground plane according to an example embodiment of the present disclosure;

FIG. 6 is a block diagram of a system for implementing the methods described herein for establishing correspondences between images using through generation of a translation between the different perspectives according to an example embodiment of the present disclosure; and FIG. 7 is a flowchart of operations for establishing correspondences between images using through generation of a translation between the different perspectives according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for establishing correspondences between images taken from substantially different perspectives, and more particularly, for establishing correspondences between images using through generation of a translation between the different perspectives. Example embodiments described herein facilitate the correlation of points in images taken from different perspectives which enables accurate locating and positioning of objects, boundaries, and other elements within an environment. While example embodiments described herein may be implemented in a variety of use cases, embodiments may be particularly useful in the generation of and updating/repairing of maps of environments to facilitate autonomous or semi-autonomous vehicle control through the environment. Establishing the accurate position of points between images of two different perspectives provides for precise mapping of object location which may be useful for a variety of use cases, such as geological mapping, erosion control and monitoring, tactical and military operations, building and construction compliance, etc. However, the use case of generating high-precision high-definition (HD) three-dimensional maps is particularly beneficial to autonomous and semi-autonomous vehicle control.

Autonomous vehicles leverage sensor information relating to roads and objects and features proximate the roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control and may be able to replicate road segments virtually with the inclusion of accurately placed signs and other features or objects proximate a roadway.

HD maps have a high precision at resolutions that may be down to several centimeters that identify objects proximate a road segment, such as features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment. According to some embodiments, vehicles may include multiple sensors and may seek to compare the data between the different sensors and/or sensor types to determine how closely they match. Determining how closely the image of a first sensor matches the image of a second sensor may be useful in a variety of ways to confirm sensor accuracy, to confirm map data, to measure sensor disparity, etc.

When images are captured from different perspectives, the correlation of points within those images to one another for precise locating of objects within the images can provide comprehensive three-dimensional mapping from different viewpoints. While the three-dimensional locating of objects and road boundaries for a vehicle as they traverse an environment is important, the ability to correlate the identified objects and the position of the vehicle from an overhead perspective of the environment is useful for route guidance and autonomous vehicle control.

Embodiments described herein may also broadly relate to computer vision when there is a need to establish the position of an object within an environment and to identify that position within multiple perspectives of the environment. For example, objects and features along a road segment may be detected through processing of sensor data. As the sensor data may be generated from a vehicle traveling along the road segment, the sensor data of some embodiments may not include object information from a perspective other than from along the road segment. As such, the degree to which sensor data may be relied upon for accurate positioning estimation of the object within three-dimensional space may be limited due to parallax effects between the relative sensor positions. According to other embodiments of the present disclosure, sensor data gathered by a vehicle or apparatus traveling within an environment may establish correspondence of points within the sensor data with points from sensors having other perspectives, such as fixed sensors along a road segment, satellite imagery, drone images or other aerial image data, etc. Embodiments described herein provide a method of establishing correspondences in three-dimensional space between points in two-dimensional images, and more particularly, to identifying potential correspondence between image points and using clustering and filtering to generate consistent three-dimensional points of correspondence between two-dimensional images.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In one embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated, e.g., in communication, with any number of sensors 21, such as a global positioning system (GPS), accelerometer, an image sensor, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate or complementary embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to roadways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology, such as a Global Positioning System, may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

Properly determining the three-dimensional position of objects in an environment and establishing an accurate position between different perspectives of the environment is instrumental in generating and updating HD maps for use in autonomous and semi-autonomous vehicle control. Three-dimensional sensing of positions of points in an environment is costly and not widely available. As two-dimensional image capture is far more ubiquitous than three-dimensional environment sensing, establishing three-dimensional points in an environment from two-dimensional images is useful to cover large areas. Three-dimensional geometry can be established through image correspondences from image pairs as described herein as a more cost-effective and efficient method of generating three-dimensional geometry. Establishing correspondence between points within images of different perspectives is challenging; however, embodiments described herein provide an efficient and accurate mechanism for cross-view image correspondences using a rigid "ray-to-point" translation that can provide correspondences between images from substantially different viewpoints.

Image correspondence relates to estimating which parts in one image correspond to which parts in another image when the images are capturing at least portions of the same scene or environment. Differences in images can be due to different times of capture leading to different lighting and illumination, different vantage points, perspective, camera orientation, etc. The issue of correspondence can be generalized to more than two images. Image correspondence is a foundational problem in computer vision and map generation/updating. For each of these implementations, it is essential to have correspondences between images from different perspectives in order to calculate the unique real-world coordinates of the features involved or to find the geometric transformation of one image to the other. Correspondence estimation is essential to creating and updating three-dimensional representations of an environment using image sensors.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, road information/warning signs, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, potholes, etc.) and temporary road changes, such as may be caused by construction.

Further, in order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. Embodiments described herein include a method to improve the performance of identifying the three-dimensional position of objects in an environment through image correspondences. More specifically, embodiments identify potential correspondence between image points in images from vastly different perspectives, such as between a birds-eye view and a street view. Further, embodiments use the correspondence to identify a transformation that can be applied to points within an image to translate them to their appropriate corresponding point in an image from another perspective.

As described above, HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. It may be difficult to accurately locate an object in three dimensional space based on a plurality of sensors detecting the object in three dimensional space from a single observation point as found in a single image of a sensed environment or inferring the object in three dimensional space from a single observation point when using a single sensor. Embodiments described herein provide a method of identifying correspondences between image points in images captured from distinctly different perspectives. The images may be captured by two distinct image sensors (e.g., a ground-based vehicle sensor and an aerial image sensor) provided the sensor data includes at least a portion of an environment or scene common to both.

Cross-view image correspondence refers to estimating which pixels in one image correspond with which pixels in another image, where the view geometry or perspective of the two images is substantially different. For example, if a first image is captured from a first image sensor with a field-of-view about a first axis, the second image is captured from a second image sensor with a field of view about a second axis that is distinct from the first axis by, for example, forty-five degrees or more. A typical example of differing view geometry may include a top-down, "birds' eye" view such as one captured by an aircraft, satellite, drone, or the like, and a street-level view captured by a closed-circuit image sensor, mobile device, vehicle camera, or the like. The correspondence problem can be generalized to more than two images viewing a scene or environment.

Cross-view image correspondence is a difficult problem in computer vision and finds a principle application in the bundle adjustment of image parameters, where the correspondences are used to determine or refine the position, orientation, or intrinsic parameters of the image sensors that captured the images. In bundle adjustment problems, one can treat images taken from one view as having known parameters if the source is known to be of high positioning accuracy. In such an example, one attempts to transfer the accuracy from one source to the other through the cross-view correspondences.

Embodiments described herein provide an algorithm to find cross-view correspondences between images using a method based on translation of rays derived from an image with three dimensional points derived from another image. The three-dimensional points are established by triangulating image correspondences from one of the image sources that is presumed to have a high positioning accuracy. Embodiments provided herein are computationally efficient and generally geometry based.

According to an example embodiment described herein, sensor data is captured by sensors associated with a vehicle, mobile device, or other sensor carrying apparatus at a position within an environment. This type of sensor data capture may be referred to as terrestrial as it is captured from a sensor located within an environment, such as along a road. While embodiments are described herein with respect to a sensor associated with a vehicle, sensors may generally be any image capture sensor that is not stationary and is capable of capturing images of an environment as it moves within the environment, such as a sensor associated with a person, autonomous apparatus, drone, watercraft, aircraft, etc.

A second sensor may capture second sensor data from a different perspective. Such a sensor may be associated with an aerial vehicle such as a drone or aircraft, or may be associated with a satellite, for example. This sensor data is aerial sensor data.

Embodiments provided herein require at least one of the sources of the sensor data carrying or supporting the sensor to be located with a high degree of accuracy. This may be performed by the source, such as a vehicle or mobile device that includes sensors for positioning. Such sensors may include GPS, GLONASS, wireless fingerprinting, cellular triangulation, inertial measurement units, or combinations thereof. Identifying the location from which sensor data is captured is important for generating rays between the sensor and a location in the sensor data, such as an object location.

The source of sensor data having a high degree of position accuracy as described herein is further capable of identifying image correspondences between multiple images and to determine three-dimensional correspondences from the multiple image correspondences. At least one of the sources is thus able to identify objects in three dimensions based on an analysis of images from different perspectives from the same source. Given the three-dimensional coordinates derived from image correspondences within the source of sensor data having a high degree of position accuracy, embodiments described herein provide a method for cross-view image correspondence. Embodiments reduce or minimize the overall discrepancy between the three-dimensional points and rays projected from the images from the source of sensor data not having a high degree of position accuracy. According to the methods described herein, a rigid translation of these rays is sufficient to reduce or minimize the discrepancy, and embodiments provide a method to determine the translation. Once the translation is established, cross-view correspondences are determined by assigning a ray to its nearest three-dimensional point subject to a maximum matching threshold.

Embodiments of the present disclosure receive sensor data including images from two distinct perspectives that share at least a portion of the captured environment. According to some embodiments, points within the images that are to be corresponded are given. These image points are established through automated detection or manual labeling. FIG. 3 illustrates an example embodiment of an environment 200 including a plurality of three-dimensional position points, 212, 214, and 216. These points are received as an input to the algorithm described herein. The three-dimensional coordinates of these points are identified in the HD maps as described above. According to the illustrated embodiment, a terrestrial sensor is the first sensor having highly accurate positioning.

As shown in FIG. 3, a plane 202 is established as the approximate ground plane. The plane 202 does not need to necessarily reflect the exact ground plane or terrain, but serves as a plane of projection as described further below. The three-dimensional position points 212, 214, and 216 are projected onto the approximate ground plane 202 to become first projected points 222, 224, and 226 within the plane 202. According to the illustrated embodiment, second sensor data in the form of a second image is captured by a second sensor, which in the illustrated embodiment is an aerial sensor from an altitude above the approximate ground plane 202. Rays 232, 234, and 236 are projected from the second sensor position into the approximate ground plane 202, and intersect with the approximate ground plane at second projected points 242, 244, and 246.

FIG. 4 illustrates the first projected points 222, 224, and 226 from the first sensor data and the second projected points 242, 244, and 246 from the second sensor data. All pairwise vectors are computed between the first projected points and the second projected points as illustrated by the arrows between the projected points in FIG. 4. The pairwise vectors may then be clustered for those having similar magnitude and orientation which results in a unique "best translation" vector. This vector identifies a shift or translation for projected points from the sensor with the lower degree of positioning accuracy to correspond with the projected points from the sensor with the higher degree of positioning accuracy. The translation vector is used to translate the second projected position points 242, 244, and 246 to translated second projected position points 262, 264, and 266, as shown in FIG. 5. The translation vectors 280 are represented as the arrows between the second projected position points and the translated second projection position points.

According to embodiments described herein, correspondences between the second projected position points 242, 244, and 246 and the corresponding first projected position points 222, 224, and 226, respectively, are assigned using the translation vector. The assignment is from the translated second projected position points 262, 264, and 266 to the closest first projected position points of 222, 224, and 226. However, correspondences with a distance to the closest first projection point above a predefined maximum threshold distance are filtered out to avoid improper correspondences.

Using the above-described techniques, an accurate location of a point in an aerial image can be correlated with a three-dimensional position point within a terrestrial image captured by a sensor associated with an accurate means for positioning. This provides detailed information regarding the location of a point or object in three dimensional space from distinct perspectives for accurate reconstruction or representation of an object in an HD map or positioning of a sensor within an environment. This results in a more efficient mechanism for processing sensor data from detectors and building or revising HD maps and facilitating the transit of a vehicle within an environment.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps.

According to example embodiments described herein, the role of HD maps in facilitating autonomous or semi-autonomous vehicle control may include crowd-sourced building of the maps to identify and confirm features of the maps and their respective locations. In the context of map-making, the features from the environment may be detected by a vehicle traveling along a road segment and consolidated to form a representation of the actual real-world environment in the form of a map. Embodiments described herein include a method, apparatus, and computer program product to establish correspondences between images taken from substantially different perspectives, and more particularly, to establish correspondences between images using through generation of a translation between the different perspectives.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith.

FIG. 6 illustrates an example embodiment of architecture specifically configured for implementing embodiments described herein. The illustrated embodiment of FIG. 4 may be vehicle-based, where sensor data is obtained from sensors of a vehicle traveling along a road segment. The location of the collected sensor data along the road segment may be determined through location determination using GPS or other positioning means and correlated to map data of map data service provider 108. As illustrated, the architecture includes a map data service provider 108 that provides map data (e.g., HD maps and policies associated with road links within the map) to the Advanced Driver Assistance System (ADAS) 305, which may be vehicle-based or server based depending upon the application and may receive vehicle position 350 and navigation information 355. The map data service provider may be a cloud-based 310 service. The ADAS receives navigation information 355 and vehicle position 350 and may use that information to map-match 315 the position to a road link on a map of the mapped network of roads stored in the map cache 320 and/or ADAS map database 330. This link or segment, along with the direction of travel, may be used to establish, using data access layer 335, which HD map policies are applicable to the vehicle associated with the ADAS, including sensor capability information, autonomous functionality information, etc. The policies may be stored, for example, in HD map policies 325. Accordingly, policies for the vehicle are established based on the current location and the environmental conditions (e.g., traffic, time of day, weather). The HD map policies 325 associated with the road segment specific to the vehicle are provided to the vehicle control, such as via the CAN (computer area network) BUS (or Ethernet or Flexray) 340 to the electronic control unit (ECU) 345 of the vehicle to implement HD map policies, such as various forms of autonomous or assisted driving, or navigation assistance.

A vehicle traveling along a road segment may receive sensor data from a plurality of sensors used to capture data relating to the surrounding environment, such as the position of an object (e.g., a sign as described herein) relative to a vehicle and the road segment. A vehicle with autonomous or semi-autonomous control may detect features in the environment, such as information contained on a sign, to facilitate the autonomous or semi-autonomous control. Sensor redundancy may be used to provide additional confirmation relating to features and objects of the environment and to improve detection and reliability of vehicle interpretation of the surrounding environment. Understanding of the position of a point captured by a sensor on the vehicle relative to an aerial image may facilitate tracking the vehicle location within a map representing an aerial view of a region. Further, when embodiments of the present disclosure are implemented across a wide range of vehicles traveling among a road network, accurate tracking of the vehicles can facilitate traffic planning, traffic control (e.g. traffic light timing), and various other location-based services using the accurate location established through correspondences between terrestrial image captures and aerial image captures.

FIG. 7 illustrates a flowchart depicting a method according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 is a flowchart of a method for establishing correspondences between images using through generation of a translation between the different perspectives. Three-dimensional coordinates of points in a first image of an environment captured in first sensor data by a first image sensor from a first perspective are received at 410. The first image sensor is associated with a highly accurate positioning means whereby the location of the first image sensor is well understood. Further, the three-dimensional coordinates of the points in the first image of the environment may be established through triangulation of the points between a pair or more images or understood through object locating within an HD map in an image from an accurate location and field of view. The three-dimensional coordinates of points in the first image of the environment are projected onto an approximate ground plane to form first projected points as shown at 420 and illustrated in FIG. 3.

As shown at 430 of FIG. 7, second sensor data is received from a second image sensor, the second sensor data including a second image of the environment captured from a second perspective. At 440, rays are projected from the second sensor data into the approximate ground plane to generate second projected points. The rays may be established, for example, from the position of the second sensor through each of a series of image correspondences corresponding to the first projected points. The location of the rays intersecting the approximate ground plane become the second projected points as illustrated in FIG. 3. At 450, pairwise vectors are computed between corresponding pairs of the first projected points of the first sensor data and the second projected points of the second sensor data. A translation vector from the pairwise vectors is generated at 460, where the translation vector represents a shift of the second image sensor data to correspond to ground truth data.

In an example embodiment, an apparatus for performing the method of FIG. 7 above may comprise a processor (e.g., the processor 24) configured to perform some or each of the operations (410-460) described above. The processor may, for example, be configured to perform the operations (410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-460 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive three-dimensional coordinates of points in a first image of an environment captured in first sensor data by a first image sensor from a first perspective;
   project the three-dimensional coordinates of points in the first image of the environment onto a plane of projection to form first projected points;
   receive second sensor data from a second image sensor, wherein the second sensor data comprises a second image of the environment captured from a second perspective;
   project rays from the second sensor data into the plane of projection to generate second projected points, wherein the rays comprise lines that extend from a position of the second sensor through image correspondence points of the second sensor data;
   compute pairwise vectors between corresponding pairs of the first projected points of the first sensor data and the second projected points of the second sensor data; and
   generate a translation vector from the pairwise vectors, wherein the translation vector represents a shift of the second image sensor data to correspond to a ground truth data.

2. The apparatus of claim 1, wherein the first image of the environment captured from the first perspective is captured along a first axis, wherein the second image of the environment captured from the second perspective is captured along a second axis, wherein the first axis and the second axis are separated by at least 45 degrees.

3. The apparatus of claim 1, wherein causing the apparatus to generate a translation vector from the pairwise vectors comprises causing the apparatus to:
   cluster the pairwise vectors according to magnitude and orientation; and
   generate a translation vector from clusters of the pairwise vectors.

4. The apparatus of claim 1, wherein the apparatus is further caused to translate the second projected points using the translation vector to obtain correspondences between the second projected points and the first projected points.

5. The apparatus of claim 4, wherein the apparatus is further caused to:
establish an orientation of the second image sensor based, at least in part, on the correspondences between the second projected points and the first projected points.

6. The apparatus of claim 4, wherein the apparatus is further caused to:
identify a precise location of the second image based, at least in part, on the correspondences between the second projected points and the first projected points.

7. The apparatus of claim 6, wherein the apparatus is further caused to:
provide for building or updating a map in a map database based on the precise location of the second image.

8. The apparatus of claim 1, wherein the apparatus is further caused to:
assign correspondences between the first projected points and the second projected points using the translation vector.

9. The apparatus of claim 8, wherein causing the apparatus to assign correspondences between the first projected points and the second projected points using the translation vector comprises causing the apparatus to assign correspondences between a respective second projected point with a respective closest one of the first projected points and excluding second projected points with a distance to a respective closest one of the first projected points above a predefined threshold distance.

10. A computer program product comprising at least one non-transitory computer-readable storage medium having computer-executable program code instructions stored therein, the computer-executable program code instructions comprising program code instructions to:
receive three-dimensional coordinates of points in a first image of an environment captured in first sensor data by a first image sensor from a first perspective;
project the three-dimensional coordinates of points in the first image of the environment onto a plane of projection to form first projected points;
receive second sensor data from a second image sensor, wherein the second sensor data comprises a second image of the environment captured from a second perspective;
project rays from the second sensor data into the plane of projection to generate second projected points, wherein the rays comprise lines that extend from a position of the second sensor through image correspondence points of the second sensor data;
compute pairwise vectors between corresponding pairs of the first projected points of the first sensor data and second projected points of the second sensor data; and
generate a translation vector from the pairwise vectors wherein the translation vector represents a shift of the second image sensor data to correspond to a ground truth data.

11. The computer program product of claim 10, wherein the first image of the environment captured from the first perspective is captured along a first axis, wherein the second image of the environment captured from the second perspective is captured along a second axis, wherein the first axis and the second axis are separated by at least 45 degrees.

12. The computer program product of claim 10, wherein the program code instructions to generate a translation vector from the pairwise vectors comprise program code instructions to:
cluster the pairwise vectors according to magnitude and orientation; and
generate a translation vector from clusters of the pairwise vectors.

13. The computer program product of claim 10, further comprising program code instructions to translate the second projected points using the translation vector to obtain correspondences between the second projected points and the first projected points.

14. The computer program product of claim 13, further comprising program code instructions to:
establish an orientation of the second image sensor based, at least in part, on the correspondences between the second projected points and the first projected points.

15. The computer program product of claim 13, further comprising program code instructions to:
identify a precise location of the second image based, at least in part, on the correspondences between the second projected points and the first projected points.

16. The computer program product of claim 15, further comprising program code instructions to:
provide for building or updating a map in a map database based on the precise location of the second image.

17. The computer program product of claim 10, further comprising program code instructions to:
assign correspondences between the first projected points and the second projected points using the translation vector.

18. The computer program product of claim 17, wherein the program code instructions to assign correspondences between the first projected points and the second projected points using the translation vector comprise program code instructions to assign correspondences between a respective second projected point with a respective closest one of the first projected points and excluding second projected points with a distance to a respective closest one of the first projected points above a predefined threshold distance.

19. A method comprising:
receiving first sensor data from a first image sensor, wherein the first sensor data comprises a first image of an environment captured from a first perspective;
receiving second sensor data from a second image sensor, wherein the second sensor data comprises a second image of the environment captured from a second perspective;
identifying image correspondence points between the first sensor data and the second sensor data;
computing pairwise vectors between corresponding pairs of first projected points of the first sensor data and second projected points of the second sensor data;
clustering the pairwise vectors according to magnitude and orientation; and
generating a translation vector from clusters of pairwise vectors, wherein the translation vector represents a shift of the second image sensor data to correspond to a ground truth data.

20. The method of claim 19, wherein computing pairwise vectors between corresponding pairs of first projected points of the first sensor data and second projected points of the second sensor data comprises:
projecting the three-dimensional coordinates of points in the first image of the environment onto a plane of projection to form the first projected points;

projecting rays from the second sensor data into the plane of projection to generate the second projected points, wherein the rays comprise lines that extend from a position of the second sensor through image correspondence points of the second sensor data; and computing pairwise vectors between corresponding pairs of the first projected points of the first sensor data and the second projected points of the second sensor data.

\* \* \* \* \*